(12) United States Patent
Takahashi

(10) Patent No.: US 9,402,058 B2
(45) Date of Patent: Jul. 26, 2016

(54) CONTENT DELIVERY SYSTEM, CONTENT DELIVERY METHOD AND CONTENT DELIVERY PROGRAM

(75) Inventor: Eiji Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1160 days.

(21) Appl. No.: 13/386,332

(22) PCT Filed: Jul. 22, 2010

(86) PCT No.: PCT/JP2010/062328
§ 371 (c)(1),
(2), (4) Date: Jan. 20, 2012

(87) PCT Pub. No.: WO2011/010688
PCT Pub. Date: Jan. 27, 2011

(65) Prior Publication Data
US 2012/0124159 A1      May 17, 2012

(30) Foreign Application Priority Data

Jul. 22, 2009   (JP) ................................ 2009-171362

(51) Int. Cl.
| G06F 15/167 | (2006.01) |
| H04N 7/173 | (2011.01) |
| H04N 21/231 | (2011.01) |
| G06F 12/08 | (2016.01) |
| G06F 12/12 | (2016.01) |

(52) U.S. Cl.
CPC ........ *H04N 7/17318* (2013.01); *G06F 12/0813* (2013.01); *G06F 12/122* (2013.01); *H04N 21/23106* (2013.01); *H04N 21/23113* (2013.01)

(58) Field of Classification Search
CPC . H04L 67/2842; H04L 65/60; H04L 65/4084; H04L 67/288; H04L 67/289; H04N 21/23106; H04N 21/23113
USPC .................................................. 709/203, 213
See application file for complete search history.

(56) References Cited

U.S. PATENT DOCUMENTS

| 5,822,759 | A | * | 10/1998 | Treynor ......................... 711/134 |
| 6,742,084 | B1 | * | 5/2004 | Defouw ................ G06F 12/122 |
| | | | | 711/133 |
| 7,028,096 | B1 | * | 4/2006 | Lee ................................. 709/231 |
| 8,683,066 | B2 | * | 3/2014 | Hurst et al. .................... 709/231 |
| 2004/0139282 | A1 | * | 7/2004 | Yoshioka ............ G06F 12/0238 |
| | | | | 711/133 |

(Continued)

FOREIGN PATENT DOCUMENTS

| JP | 2004-145613 A | 5/2004 |
| JP | 2007-053593 A | 3/2007 |

(Continued)

*Primary Examiner* — Duyen Doan
(74) *Attorney, Agent, or Firm* — Sughrue Mion, PLLC

(57) ABSTRACT

In order to stably deliver content data over a network, a content delivery system is provided with: a content retention module for storing content data consisting of hierarchically encoded hierarchical data; a cache retention module for caching content data; a hierarchical score determination module for calculating an access requirement frequency for each piece of cached hierarchical data; a hierarchical arrangement determination module for replacing hierarchical data having an access requirement frequency lower than a fixed value with the hierarchical data stored in the content retention module; and a content delivery module for delivering content data in response to requests from a client device.

7 Claims, 12 Drawing Sheets

(56) References Cited

U.S. PATENT DOCUMENTS

| | | |
|---|---|---|
| 2005/0187960 A1 | 8/2005 | Nomura |
| 2007/0076756 A1* | 4/2007 | Chan ................ H04L 29/06027 370/468 |
| 2011/0238927 A1* | 9/2011 | Hatano ................ G06F 12/122 711/145 |
| 2012/0278619 A1* | 11/2012 | Tam ................ H04N 21/23473 713/168 |

FOREIGN PATENT DOCUMENTS

| | | |
|---|---|---|
| JP | 4408811 B2 | 2/2010 |
| WO | WO 2004/040908 A1 | 5/2004 |

* cited by examiner

CONTENT DELIVERY SYSTEM, CONTENT DELIVERY METHOD AND CONTENT DELIVERY PROGRAM

CROSS REFERENCE TO RELATED APPLICATION

This application is a National Stage of International Application No. PCT/JP2010/062328, filed on Jul. 22, 2010, claiming priority based on Japanese Patent Application No. 2009-171362, filed Jul. 22, 2009, the contents of all of which are incorporated herein by reference in their entirety.

TECHNICAL FIELD

The present invention relates to a content data delivery system which delivers content data such as video data via a network.

BACKGROUND ART

There is known a content delivery system which delivers content data such as video data via a network in response to a request from a client terminal.

Considered herein is a content delivery system which delivers content data to client terminals set in advance from a storage device which retains content data such as video data.

In general, a cache device connected to the storage device is provided to the content delivery system, and requested content data is cached to the cache device from the storage device when the content data requested by the client terminal is not in the cache device (cache fill). Further, when the requested content data is retained in the cache device (cache hit), the content data is delivered to the client terminal in response to the request from the client terminal (content delivery request).

Further, when the requested content data is not retained in the cache device (cache hit miss), the content data is loaded (cached) to the cache device from the storage device, and the content data is delivered to the client terminal from the cache device thereafter.

Furthermore, when a region (capacity) for allotting (retaining) the content data to the cache device is insufficient, the content data retained prior to that point is discarded and new content data is cached (cache replacement).

Thereby, in the cache device, cache replacement is done when the capacity for caching the content data is insufficient so that the content data retained in the cache device is replaced.

Incidentally, with the content delivery system, it is generally required to reduce delay time of packet provided to the client terminal and to deliver the content data stably in a specific contracted band.

Further, it is also required to perform efficient content delivery to an unspecified large number of client terminals by corresponding to respective given environments such as network load, processing ability of each client terminal, congestion level of the delivery server, or the like on a real-time basis.

For this, for example, there are methods such as a streaming delivery and a content delivery network (CDN), which suppress generation of transmission delay by efficiently storing (arranging) content data in accordance with the access request frequency degree from the client to the storage device and the cache device and stably secure the specific transmission band by dispersing the load to the network and the delivery server.

With the streaming delivery, the delivery server for delivering a content sections moving picture file data into a plurality of pieces of partial data and delivers the partial data in a plurality of times in a divided manner, and the client terminal reproduces the divided file data (partial data) in order every time upon receiving the data.

Thereby, it becomes unnecessary for the client terminal side to wait for all the moving picture files (content data) such as a video to be downloaded (reducing the waiting time). Further, even when there is a fault generated on the line, it is possible to reproduce the already received file data.

Further, with CDN, through placing the delivery servers not on a specific point on a network but at different points close to the client devices as much as possible on the network for dispersing the load of data delivery, it is possible to avoid having the load concentrated to a specific point. Further, it is also possible to decrease deterioration of the delivery quality caused due to packet transmission delay and the like. Therefore, it is particularly effective for the streaming delivery with which a vast amount of file data is transmitted and received.

However, with CDN, it is necessary to provide the delivery servers dispersedly in a wide range, thereby requiring a great amount of cost. Therefore, it is required to reduce the storage regions for each delivery server as much as possible and, further, to utilize the limited storage capacity efficiently.

Further, as an algorithm for cache replacement for efficiently utilizing the storage capacity of the cache device and the storage device, etc., there are LRU (Least Recently Used) which discards the one whose latest access made thereto is the longest time ago, LFU (Least Frequently Used) which discards the one that has been accessed for the least number of times.

For this, there is disclosed a method which improves the use efficiency of the cache region through storing a content to a cache by dividing it into a plurality of encoded layers by using a technique which hierarchically encodes video signals as content data into a basic layer and an extension layer containing a more highly detailed data content (Patent Document 1).

Further, when a part of encoded bit stream is decoded with Patent Document 1, an image of low spatial resolution can be reproduced. When remaining data in the bit stream is decoded further, an additional signal for improving the spatial resolution can be acquired. This makes it possible to perform content delivery to an unspecified large number of client terminals by corresponding to respective given environments such as network load, processing ability of each client terminal, congestion level of the delivery server, or the like on a real-time basis.

Further, as a related technique thereof, there is disclosed a stream server device which caches hierarchically encoded contents (Patent Document 2).

Furthermore, as another related technique, there is disclosed a method which takes a product of an access frequency degree by each hierarchy contained in each content, a reproduction rate, and a reproduction time (content size) as a parameter, and selects and caches the content whose parameter is the smallest in order to increase the hit rate of the cached content (cache hit rate) (Patent Document 3).

Further, as still another related technique, there is disclosed a method which specifies hierarchically encoded content data as data to be cached by a hierarchy (layer) unit and performs cache replacement (Patent Document 4).

Patent Document 1: JP, 4408811, B
Patent Document 2: WO 2004040908
Patent Document 3: Japanese Unexamined Patent Publication 2004-145613

Patent Document 4: Japanese Unexamined Patent Publication 2007-053593

However, Patent Document 1 described above is the structure which discards data of an encoding rate that is close to a requested encoding rate and stores the requested data to that position, when content data of the encoding rate requested by a client device is not stored in the cache. Thus, it is not possible to discard an unused content on the cache, i.e., a content of a low access frequency degree, and to replace it with a new content. Therefore, it is not possible to sufficiently increase the cache use efficiency by replacement.

Further, the encoding rate of the content to be stored to the cache is changed in accordance with the access frequency degree with Patent Document 1 described above. However, since the encoding rate of the content to be cached is changed based only on the content access frequency degree, the cache hit rate is deteriorated in a cache device with a limited capacity when each of the contents has different maximum reproduction rate and size.

Further, with the related technique disclosed in Patent Document 2, it is not possible to increase the cache hit rate for the cached content data.

Furthermore, as described above, with the related technique disclosed in Patent Document 3, the content having the minimum product of the access frequency degree and the content size is cached and replaced. Thus, the access frequency degree per cache capacity cannot be increased in the replaced content. In particular, when the cache capacity is small, the cache hit rate is rather deteriorated.

Further, with the related technique disclosed in Patent Document 4 described above, the hierarchically encoded data to be cached and replaced is determined regardless of the data size of each hierarchical unit and the reproduction time of the content. Therefore, when there is a limit in the cache capacity, the cache hit rate is deteriorated.

An object of the present invention is to provide a content delivery system, a content delivery method, and a content delivery program, which can stably deliver the content data such as video data via a network.

DISCLOSURE OF THE INVENTION

In order to achieve the foregoing object, the content delivery system according to the present invention is a content delivery system which includes a content retention unit which stores content data to be delivered by sectioning the data into a plurality of pieces of hierarchical data of different encoding rates; a cache retention unit which loads the content data and temporarily caches the loaded content data; and a data delivery unit which delivers the content data in response to an access request from an external terminal, and the system is structured to include a cache content replacement control unit which replaces the content cached in advance to the cache retention unit with hierarchical data read out from the content retention unit, wherein the cache content replacement control unit includes: an access frequency degree calculation module which calculates access request frequency degrees from the external terminal for each of the content data and each hierarchical data of the content data; a score determination module which calculates scores showing priority degrees to be stored in the cache retention unit for each of the hierarchical data of the content data based on the calculated access request frequency degrees; and a cache content replacement/update module which judges whether or not to cache the data for each of the hierarchical data based on the scores.

Further, the content delivery method according to the present invention is a content delivery method which temporarily caches content data stored in a content retention unit by sectioning the data into a plurality of pieces of hierarchical data of different encoding rates to a cache retention unit and delivers the content data in response to an access request from an external terminal, and the method is characterized to include: calculating access request frequency degrees from the external terminal for each of the content data and each hierarchical data of the content data; calculating scores showing priority degrees to be stored in the cache retention unit for each of the hierarchical data of the content data based on the calculated access request frequency degrees; and judging whether or not to cache the data for each of the hierarchical data based on the scores.

Furthermore, the content delivery program according to the present invention is a content delivery program for delivering content data in response to an access request made from an external terminal by including: a content retention unit which stores content data to be delivered by sectioning the data into a plurality of pieces of hierarchical data of different encoding rates; a cache retention unit which loads the content data and temporarily caches the loaded content data; and a cache content replacement control unit which replaces the content cached in advance to the cache retention unit with hierarchical data read out from the content retention unit, and the program is characterized to cause a computer to execute: an access frequency degree calculation function which calculates access request frequency degrees from the external terminal for each of the content data and each hierarchical data of the content data; a score determination function which calculates scores showing priority degrees to be stored in the cache retention unit for each of the hierarchical data of the content data based on the calculated access request frequency degrees; and a cache content replacement/update function which judges whether or not to cache the data for each hierarchical data based on the scores.

The present invention is designed as the structure which includes a module that calculates the access request frequency degree of each of cached hierarchical data and a module that calculates scores of each hierarchical data based on the access frequency degree and replaces the hierarchical data cached to a content retention unit based on the scores. Thereby, it is possible to improve the cache hit rate efficiently.

BEST MODES FOR CARRYING OUT THE INVENTION

Exemplary Embodiment

Next, basic structural contents of an exemplary embodiment of the invention will be described.

Figure 1:
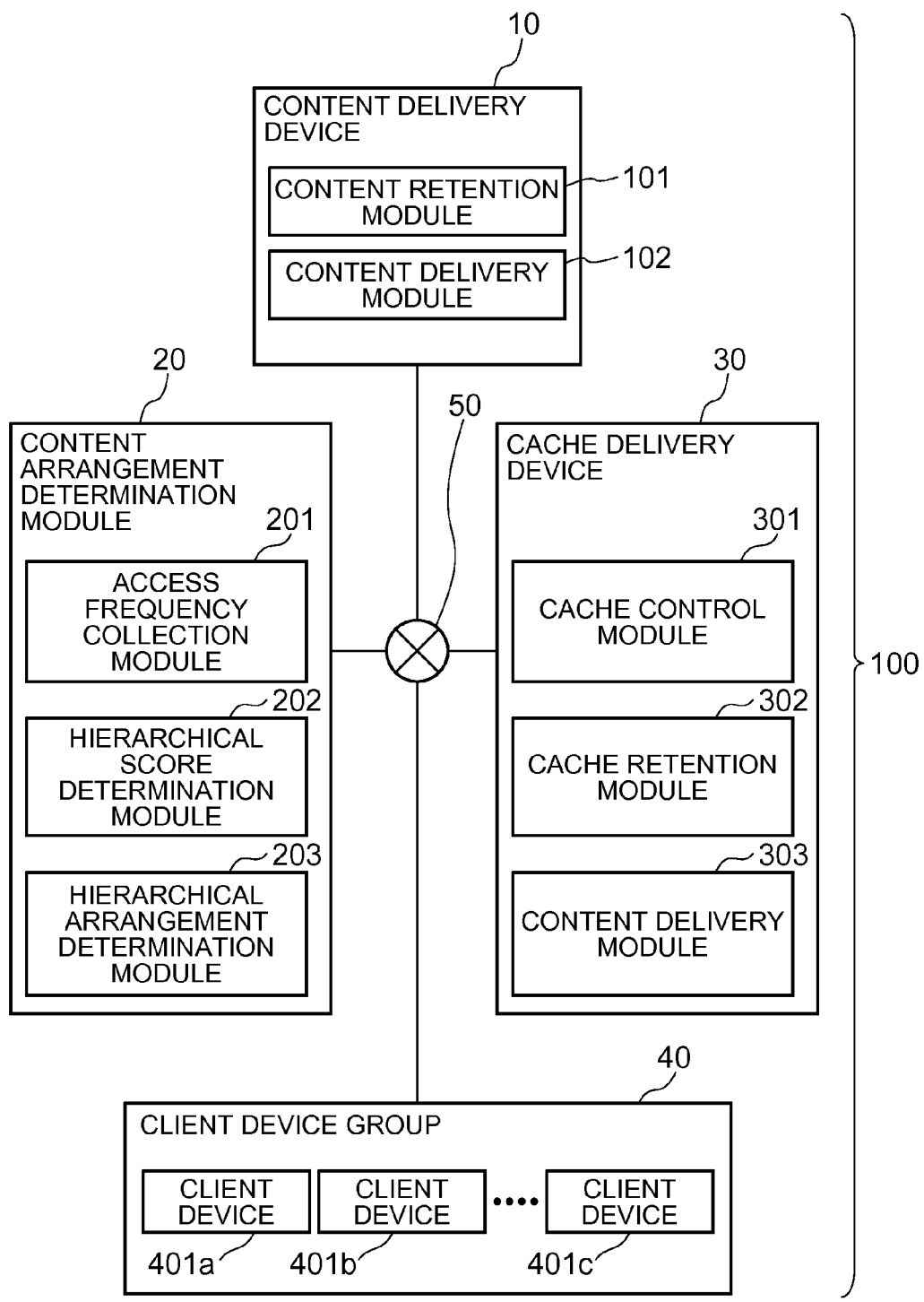
FIG. 1 is a schematic block diagram showing an exemplary embodiment of a content delivery system according to the present invention.

As shown in FIG. 1, a content delivery system 100 as the exemplary embodiment is in a structure which includes: a content delivery device 10 which stores and retains content data delivered to each of client devices 401a, 401b, 401c (referred to as "a client device group 40" as a general term thereof) connected to a network 50 such as the Internet; a cache delivery device 30 which temporarily stores content data (referred to as "content" hereinafter) sent from the content delivery device 10 via the network 50, and delivers the content in response to a request from the client devices (401a, 401b, 401c); and a content arrangement determination module 20 (cache control unit) 20 which determines the content to be loaded (cached) to the cache delivery device (cache retention module) 30 from the content delivery device (content retention unit) 10, and replaces and updates (replacement) the content data loaded to the cache delivery device 30.

It is assumed that the client device group 40 is constituted by including a plurality of different terminal devices (the client devise 401a, 401b, 401c) which receive the content via the network 50, respectively, and that each of the client devices 401a, 401b, and 401c is connected to the network 50.

Further, it is also possible to employ a structure in which four or more client devices are connected to the network 50.

The content delivery device 10 includes: a content retention module 101 which stores deliverable contents; and a content delivery module 102 which transmits the contents to each of the client terminals 401a to 401c of the client group 40 and the cache delivery device 30.

Note here that the content retention module 101 can be achieved by a hard disk device constituted with a volatile memory or a nonvolatile memory such as a magnetic disk or a semiconductor memory, RAM (Random Access Memory), ROM (Read Only Memory) capable of rewriting data, or the like.

Further, while the contents stored in the content retention module 101 are video data such as movies and dramas, the contents are not necessarily limited to the video contents. Other kinds of content data such as audio data may also be stored.

The cache delivery device 30 includes a cache control module 301 which acquires the content data from the content retention module 101 based on an instruction from the content arrangement determination module 20; a cache retention module 302 which stores the content acquired by the cache control module 301; and a content delivery module 303 which transmits the content to each of the client terminals 401a to 401c of the client group 40.

The cache control module 301 has an access frequency degree information notification function which notifies access frequency degree information showing the use state by each content and each viewing bit rate (encoded layer) stored (or arranged) in the content delivery device 10 and the cache delivery device 30 to an access frequency degree collection module 201 of the content arrangement determination module 20 via the network 50.

The access frequency degree information is defined to indicate the number of viewing times for each of contents and each viewing bit rate, the time, and the like, for example.

Further, the access frequency degree information may be the number of requested times for each content and each viewing bit rate based on the content viewing request information of the client. Furthermore, the access frequency degree information may be values showing viewing demands for each of contents and each viewing bit rate based on either one of or both of the content viewing information and the content viewing request information.

Thereby, the access frequency degree collection module 201 can calculate an access frequency degree p(k, l) for each viewing bit rate by using the layers up to an encoded layer l of a content k based on the notified access frequency degree information, for example.

Further, the cache control module 301 has a content delivery request transfer function which transmits a content delivery request to the content delivery device 10 when the search target content requested from the client device 10 is not stored (cached) in the cache retention module 302.

The content delivery module 102 transmits the search target content (encoded layer data) that is not stored (cached) in the cache retention module 302 to the client device in response to the content delivery request.

The cache retention module 302 can be achieved by a hard disk device constituted with a volatile memory or a nonvolatile memory such as a magnetic disk or a semiconductor memory, RAM (Random Access Memory), ROM (Read Only Memory) capable of rewriting data, or the like. It is assumed that an access can be made at a higher speed for the content data retained in the cache retention module 302 than to the content data stored in the content retention module.

Further, while the contents stored in the cache retention module 302 are continuous video data such as movies and dramas, the contents are not necessarily limited to the video contents. Other kinds of continuous media and content data such as audio data may also be stored.

Figure 2:
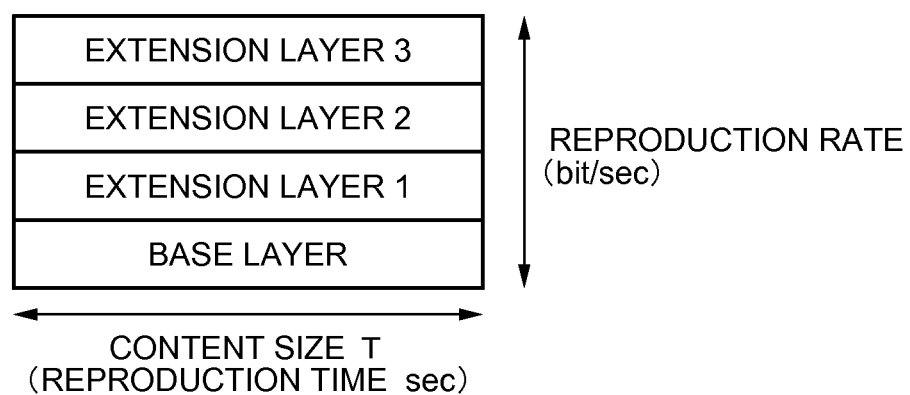
FIG. 2 is an explanatory chart showing an example of a data structure of content data in the content delivery system disclosed in FIG. 1.

It is assumed that the content data of the exemplary embodiment is encoded by a hierarchical-type encoding method as shown in FIG. 2.

The hierarchical encoding method specifically is an encoding method such as H.264/SVC defined by ITU-T, and the content data encoded by this H.264/SVC method is constituted with hierarchical data (layered data) such as a base layer, an extension layer 1, and an extension layer 2.

Further, the access frequency degree p(k, l) to the encoded layer l of the content k is aggregated by each viewed encoded layer (bit rate).

Figure 9:
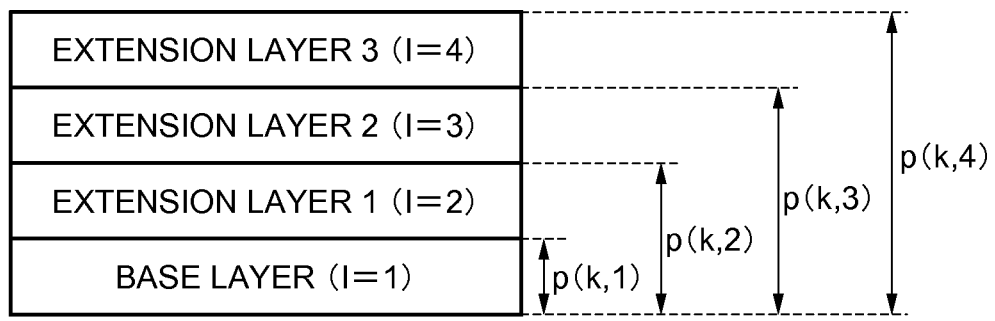
FIG. 9 is an explanatory chart showing an example of a data structure of access frequency degree information of the content delivery system disclosed in FIG. 1.

For example, as shown in FIG. 9, p(k, 1) is a value acquired by aggregating the frequency degrees of receiving and viewing the base layer (l=1) of the content k.

Furthermore, p(k, 2) is a value acquired by aggregating the frequency degrees of receiving and viewing the base layer (l=1) and the extension layer 1 (l=2) of the content k, p(k, 3) is a value acquired by aggregating the frequency degrees of receiving and viewing the base layer (l=1), the extension layer 1 (l=2), and the extension layer 2 (l=3) of the content k, and p(k, 4) is a value acquired by aggregating the frequency degrees of receiving and viewing the base layer (l=1), the extension layer 1 (l=2), the extension layer 2 (l=3), and the extension layer 3 (l=4) of the content k, respectively.

Further, with the hierarchical encoding method, it is possible to reproduce a video with a higher quality as a degree of the encoded layer to be used becomes higher. However, it is also possible to reproduce a video with data of only a lower-order layer (the base layer (FIG. 2) in this case). For example, with the content data hierarchically encoded by the hierarchical-type encoding method by H.264/SVC, the content data (video data) encoded by using the layers up to the highest-order extension layer 3 can be reproduced by the production side with a still higher picture quality.

Meanwhile, the content data (video data) encoded by using the layers up to the extension layer 1 can be reproduced with a medium screen and with a medium picture quality. The content encoded by using only the base layer is reproduced with a smaller screen and with a lower picture quality compared to the case using the layers including the extension layers 1, 2.

In the meantime, the size of the content becomes larger when the data contains the layers up to the extension layer 3 as the higher-order layer, and becomes smaller in the case only with the base layer that is the lower-order layer.

In this exemplary embodiment, the content data is sectioned according to the hierarchy of encoding and the quality (picture quality) of the data, and the data stored in the cache retention module 302 is determined by calculating the score values shown below for each of the contents and the encoded layers by using such characteristic.

The content delivery module 303 has a content delivery function which transmits the content (data) stored in the content delivery device 10 to the client device according to a request.

The content arrangement determination module 20 includes: an access frequency degree collection module 201 which acquires (collects) the access frequency degree information showing the access frequency degree from the client device for each content (each encoded layer) from the content delivery device 10 and the cache delivery device 30; a hierarchical score determination module 202 which calculates scores showing the priority degrees to be stored to the cache delivery device 30 (the cache retention module 302) by corresponding to each content and each encoded layer based on the acquired access frequency degree; and an arrangement determination module 203 which judges whether or not each content and each encoded layer is stored to the cache delivery device 30 based on the scores.

In this exemplary embodiment, it is so defined that the cache capacity set in advance to the cache delivery device 30 is x, the access frequency degree for the encoded layer l of the content k is p(k, l), and the reproduction rate of the encoded layer l of the content k is r(k, l). Further, it is also defined that the length (reproduction time) of the content k is t(k).

Under this, the content arrangement determination module 20 determines the content data to be arranged in the cache delivery device 30 with a condition of x≤Σr(k, l)×t(k).

When there is a content delivery request (access request) for the cache delivery device 30 or the content delivery device 10 from the client device (401a, b, or c), the access frequency degree collection module 201 calculates the access frequency degree p(k, l) for each viewing bit rate by using the layers up to the encoded layer l of the content k based on the access frequency degree information notified from the cache delivery device 30 or the content delivery device 10.

The hierarchical score determination module 202 calculates v(k, l) as the score value of the contents k and the encoded layer l, for example, based on a following Expression 1.

$$v(k, l) = \sum_{i=l}^{L} \frac{p(k, l)}{r(k, l)t(k)} \qquad \text{[Expression 1]}$$

Note here that v(k, l) as the score value of the encoded layer l of the content k is calculated by each encoded layer. The score value shows the priority degree for storing each hierarchical data of the content data to the cache retention unit.

Figure 10:
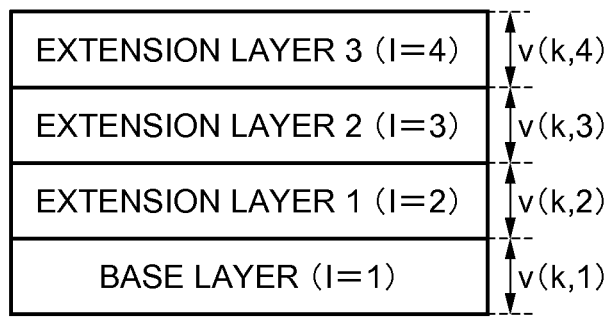
FIG. 10 is an explanatory chart showing an example of a data structure of score values showing priority degrees by each content and each encoded layer in the content delivery system disclosed in FIG. 1.

For example, as shown in FIG. 10, v(k, 1) is the score value of the base layer (l=1) of the content k, v(k, 2) is the score value of the extension layer 2 (l=3) of the content k, v(k, 3) is the score value of the extension layer 2 (l=3) of the content k, and v(k,4) is the score value of the extension layer 3 (l=4) of the content k.

The calculated score value may be a value that shows the proportion of the access frequency degree for the size of the content data.

The hierarchical score determination module 202 may be set to compare each of the score values of each encoded layer (hierarchical data) of different contents cached to the cache retention module 302 based on the access frequency degree information notified from the cache delivery device 30 or may be set to compare the score values by calculating the score values of each encoded layer of the contents stored in the content retention module 101.

Note here that the hierarchical arrangement determination module 203 replaces the encoded layer of a low access frequency degree (referred to as "low-access encoded layer") with an encoded layer of a higher access frequency degree read out from the content retention module 101.

In this case, the hierarchical arrangement determination module 203 may be set to select the encoded layer arbitrarily from the content retention module 101, for example.

The hierarchical arrangement determination module 203 compares the score values of the encoded layers within the content retention module 101 and the encoded layers within the cache retention module 302 calculated by the hierarchical score determination module 202, and determines the contents arranged (cached) to the cache delivery device 30 by a unit of encoded layer in order from the larger score value to the lower score value.

In this exemplary embodiment, writing of the content to the cache retention module 302 from the content retention module 101 is done by a unit of encoded layer. However, it is also possible to set to perform arrangement by a unit of content.

The hierarchical arrangement determination module 203 arranges the encoded layers (hierarchical data) determined based on the score values to the cache retention module 302.

The hierarchical arrangement determination module 203 does not perform arrangement by jumping a lower-order encoded layer, i.e., does not arrange a higher-order encoded layer of a same content to the cache retention module 302 under a state where a lower-order encoded layer contained in a given content is not arranged in the cache retention module 302.

The hierarchical arrangement determination module 203 performs a control so that encoded layers of a same content are not arranged in the cache retention module 302 in a duplicated manner.

Each of the content delivery device 10, the content arrangement determination module 20, and the cache delivery device 30 is a computer that includes a processor, and it is defined to achieve operational functions of each module provided inside by performing execution processing based on a program set in advance.

With the structure shown above, the exemplary embodiment can improve use efficiency of the cache region and, at the same time, can correspond to environments given to each client such as network load, processing ability of the client device, congestion level of the delivery server, or the like on a real-time basis.

Now, presented is a case where contents a, b, c, and d stored in the content retention module 101 are cached to the cache retention module 302 of 400 Mbit in cache size in the content delivery system 100 that is the exemplary embodiment.

The content a is defined to have a reproduction rate of 1 Mbps, a reproduction time (content size) of 100 sec, and an access frequency degree of 3. Further, the content b is defined to have a reproduction rate of 1 Mbps, a reproduction time (content size) of 100 sec, and an access frequency degree of 3, the content c is defined to have a reproduction rate of 2 Mbps, a reproduction time (content size) of 100 sec, and an access frequency degree of 1, and the content d is defined to have a reproduction rate of 4 Mbps, a reproduction time (content size) of 100 sec, and an access frequency degree of 1.

In a case where the content of the minimum access frequency degree or the content whose value of (access frequency degree)×(content size) is the minimum is cached (replaced) among the contents cached in advance, only the content d is to be replaced (cached) to the cache retention module 302 in the above-described case.

In that case, the cache hit rate is 10%, and the traffic between the source and cache after the cache replacement is 10 Mbps.

In the meantime, the exemplary embodiment is so set that the content (encoded layer) whose value of (access frequency degree)×(content size) is the minimum is cached (replaced) among the cached contents. Thus, in the above-described case, the contents a, b, and c are cached to the cache retention module 302. In this case, the cache hit rate is 87.5%, and the traffic between the source and cache after the cache replacement is 4 Mbps. This provides effects of improving the cache hit rate and reducing the traffic between the source and cache.

(Explanations of Operations of Exemplary Embodiment)

Next, outlines of the operations of the exemplary embodiment will be described.

First, the hierarchical score determination module 202 calculates the access request frequency degrees for each hierarchical data cached in advance to the cache retention module 302 and each hierarchical data stored in the content retention module 101 as the access frequency degrees (an access frequency degree calculation step), and the hierarchical arrangement determination module 203 calculates the score values of each hierarchical data cached in advance to the cache retention module 302 and each hierarchical data stored in the content retention module 101 based on the access frequency degrees (a score calculation step), determines the hierarchical data to be cached based on the calculated score values, and replaces the cached hierarchical data of a low score with the hierarchical data of a higher score read out from the content retention module 101 (a cache replacement step).

Note here that execution contents of the access frequency degree calculation step, the score calculation step, and the cache replacement step may be put into programs to be executed by a computer.

Figure 6:
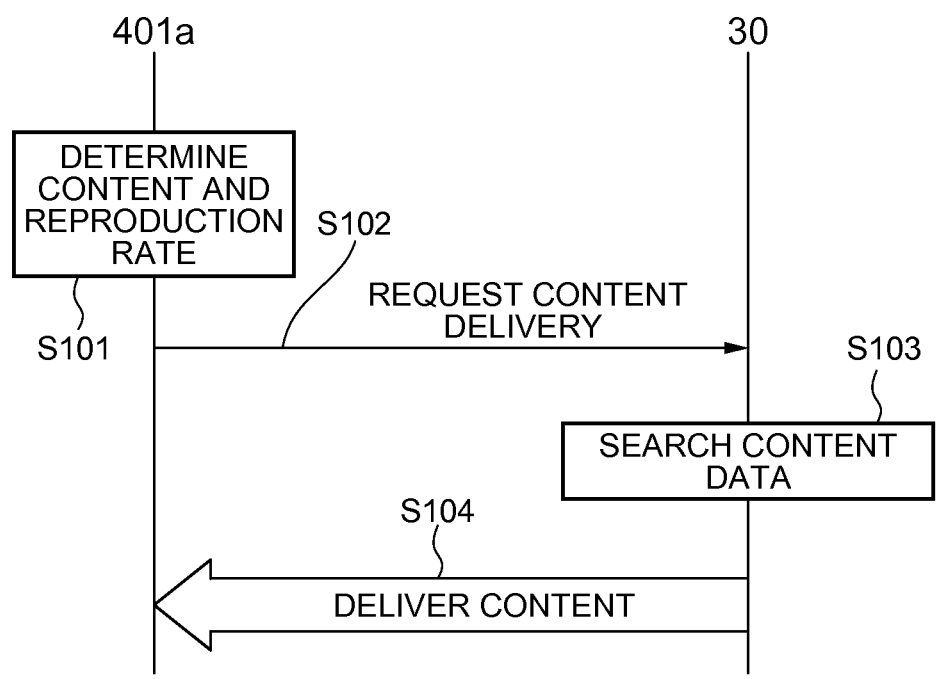
FIG. 6 is a sequence chart showing operation steps of the content delivery process of the content delivery system disclosed in FIG. 1.

Next, operations of the content delivery system 100 as the exemplary embodiment will be described by referring to the explanatory charts of FIGS. 3, 4 and the sequence chart of FIG. 6. Here, it is assumed that the client device 401a of the client device group 40 transmits a content reproduction request to the cache delivery device.

Figure 3:
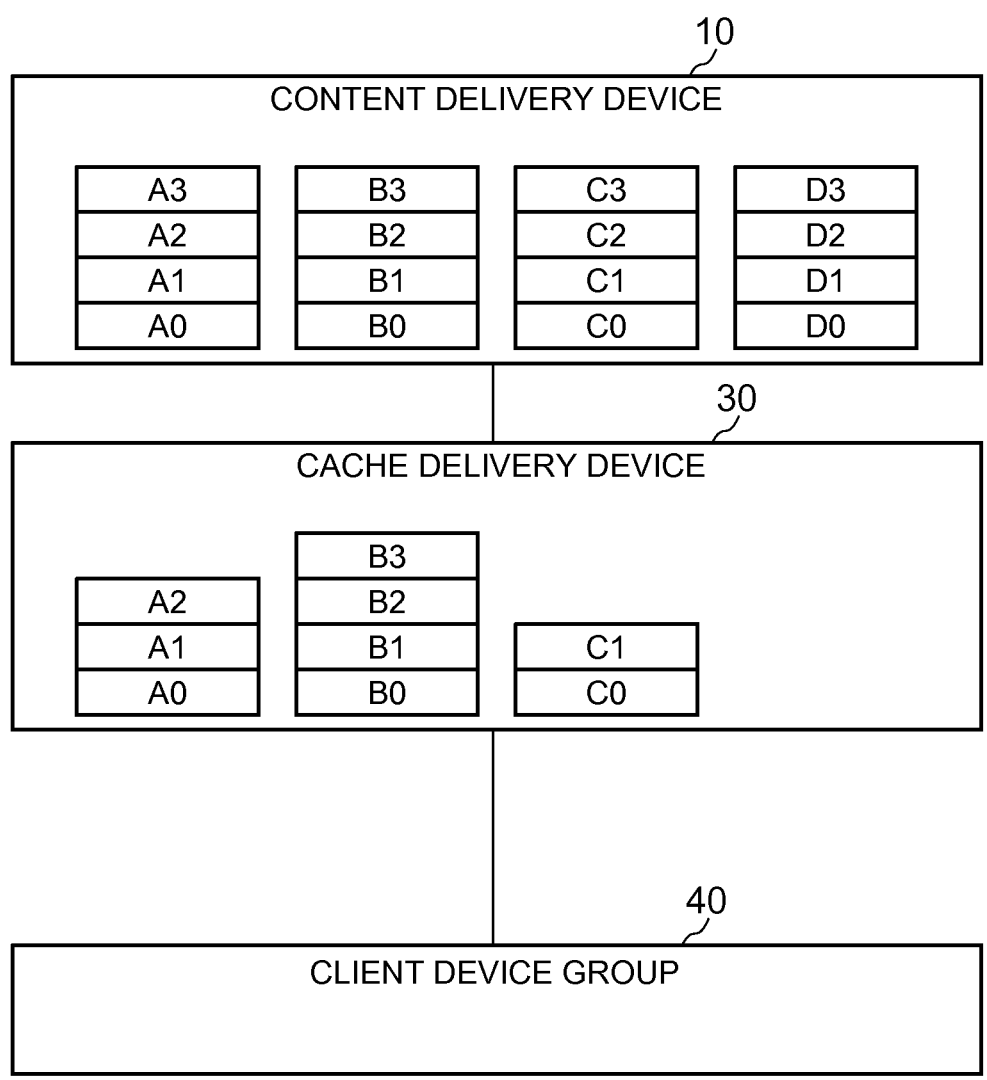
FIG. 3 is an explanatory chart showing an example of an arrangement state of content data in the content delivery system disclosed in FIG. 1.

Further, as shown in a logic chart of FIG. 3, all the content data (e.g., A, B, C, D) that can be delivered to the client device group 40 are stored in the content delivery device 10. Among those, duplicated data of a part of the content data is stored (cached) in advance to the cache delivery device 30.

It is assumed that the client devices 401b and c can also operate in the same manner as that of the client device 401a.

First, the client device 401a determines the content to be requested and the reproduction rate thereof (step S101), and requests a base layer (A0) and an extension layer (A1) of the content A (step S102).

Figure 4:
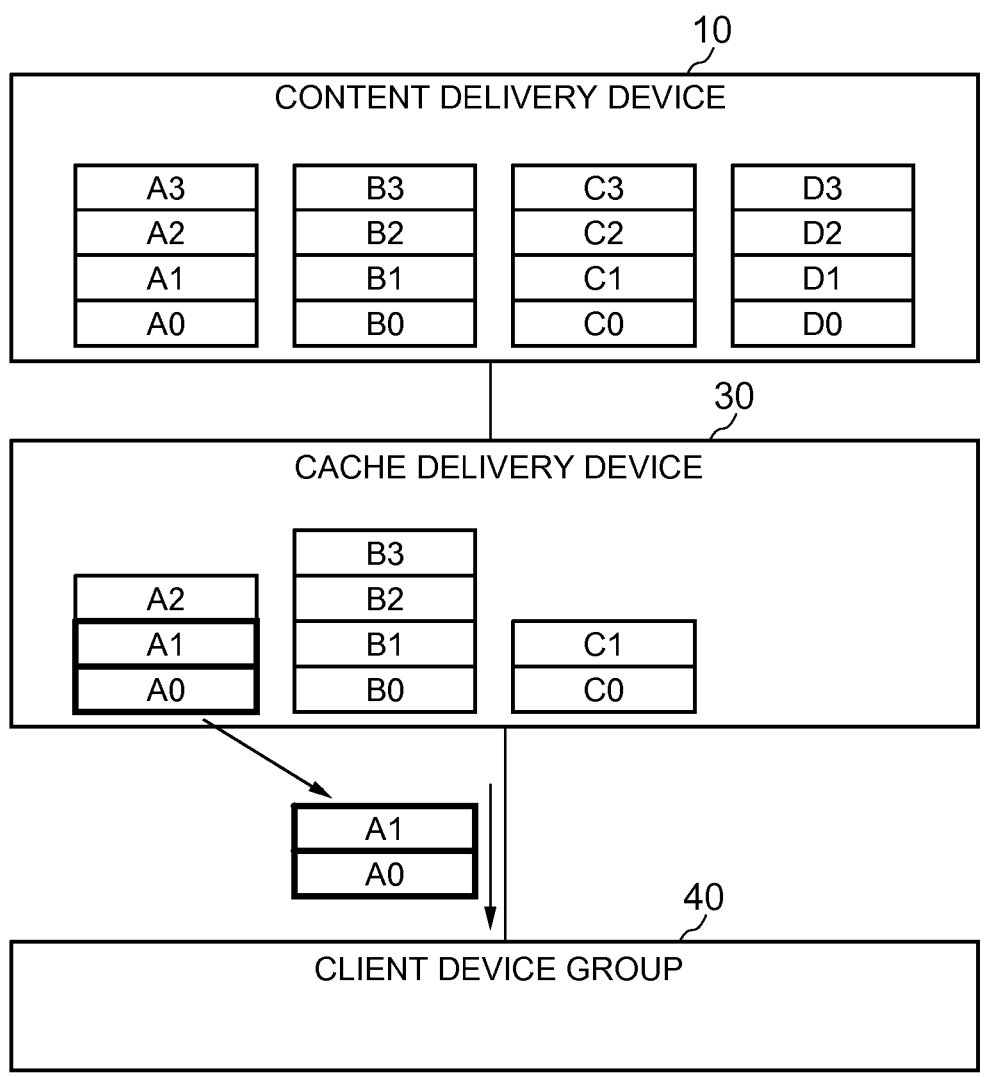
FIG. 4 is an explanatory chart showing an example of a content delivery process of the content delivery system disclosed in FIG. 1.

In this case, as shown in FIG. 4, the base layer (A0) and the extension layer (A1) of the content A are both stored in advance within the cache retention module 302 of the cache delivery device 30. Thus, the content delivery module 303 of the cache delivery device 30 searches the content data in response to the request (step S103), reads out the base layer (A0) and the extension layer 1 (A1) of the content A from the cache retention module 302, and delivers those to the client device 401a (the client device group 40) (step S104).

Thereby, the client device 401a can reproduce the delivered content A (the base layer (A0) and the extension layer 1 (A1)).

Figure 7:
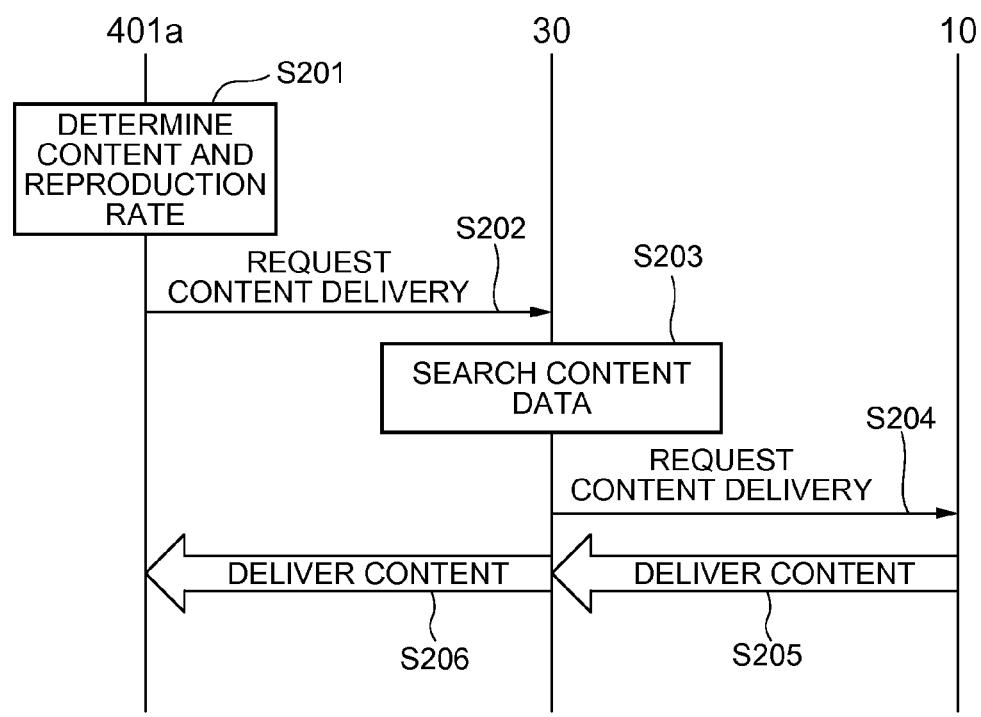
FIG. 7 is a sequence chart showing operation steps of the content delivery process of the content delivery system disclosed in FIG. 1.

Next, the operation of a case where the client device 401a requests contents C0, C1, C2 to the cache delivery device 30 will be described by referring to the explanatory charts FIGS. 3, 5 and the sequence chart of FIG. 7.

As shown in the logic chart of FIG. 3, all the content data (e.g., A, B, C, D) that can be delivered to the client device group 40 are stored in the content delivery device 10. Among those, data of a part of the content data is stored (cached) in advance to the cache delivery device 30.

First, the client device 401a determines the reproduction rate of the content (step S201), and requests the base layer (C0), the extension layer 1 (C1), and the extension layer 1 (C2) of the content C to the cache delivery device 30 thereafter (step S202: a content delivery request).

Figure 5:
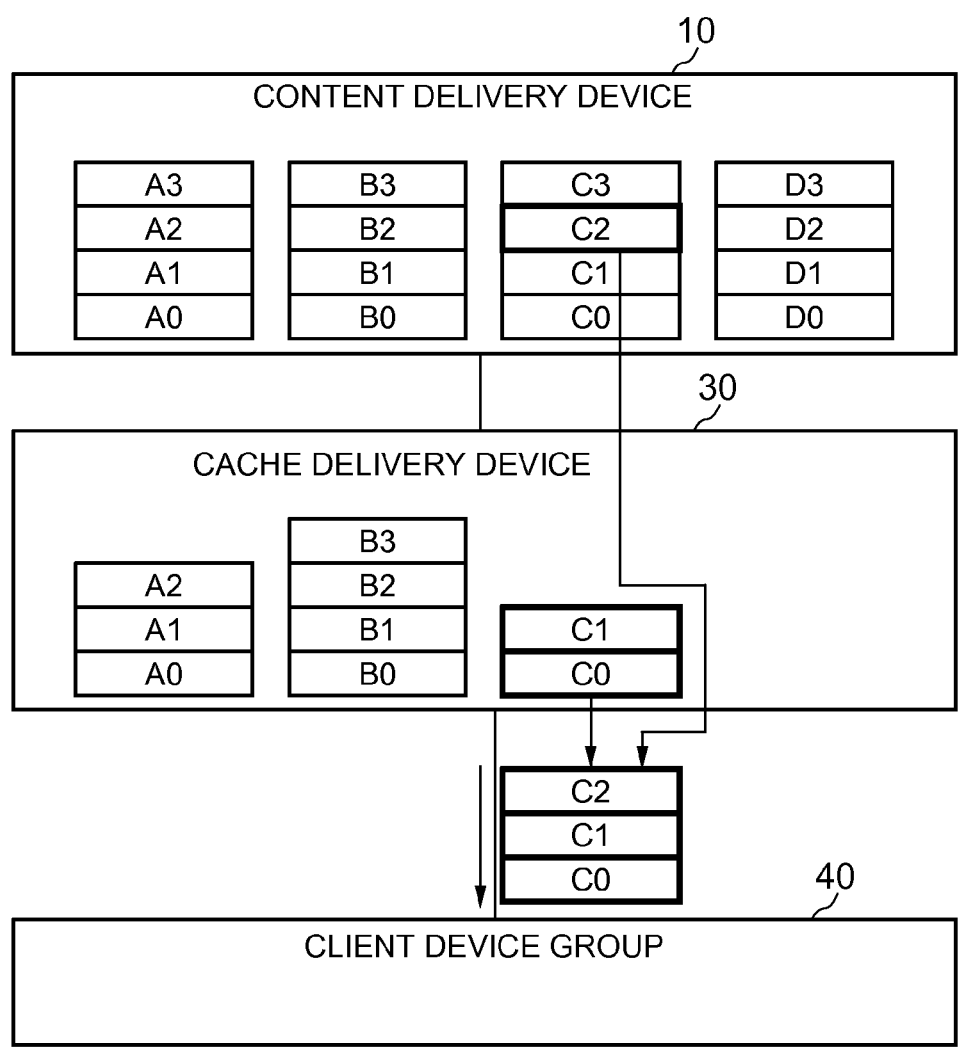
FIG. 5 is an explanatory chart showing an example of a content delivery process of the content delivery system disclosed in FIG. 1.

In this case, the base layer (C0) and the extension layer 1 (C1) of the content C are stored in advance within the cache retention module 302 as shown in FIG. 5.

The content delivery module 303 searches the content data according to the request (step S203). Here, the content delivery mole 303 gives a content delivery request to the content delivery device regarding the extension layer 2 (C2) that is not stored in the cache retention module 302 (step S204: a content delivery request).

The content delivery module 102 of the content delivery device 10 reads out the extension layer 2 (C2) according to the content delivery request from the cache delivery device 30, and delivers it to the client device 401a (step S205: content delivery).

Further, the content delivery module 303 reads out the base layer (C0) and the extension layer 1 (C1) of the content C from the cache retention module 302, and delivers those to the client device 401a (the client device group 40) (step S206: content delivery).

Figure 8:
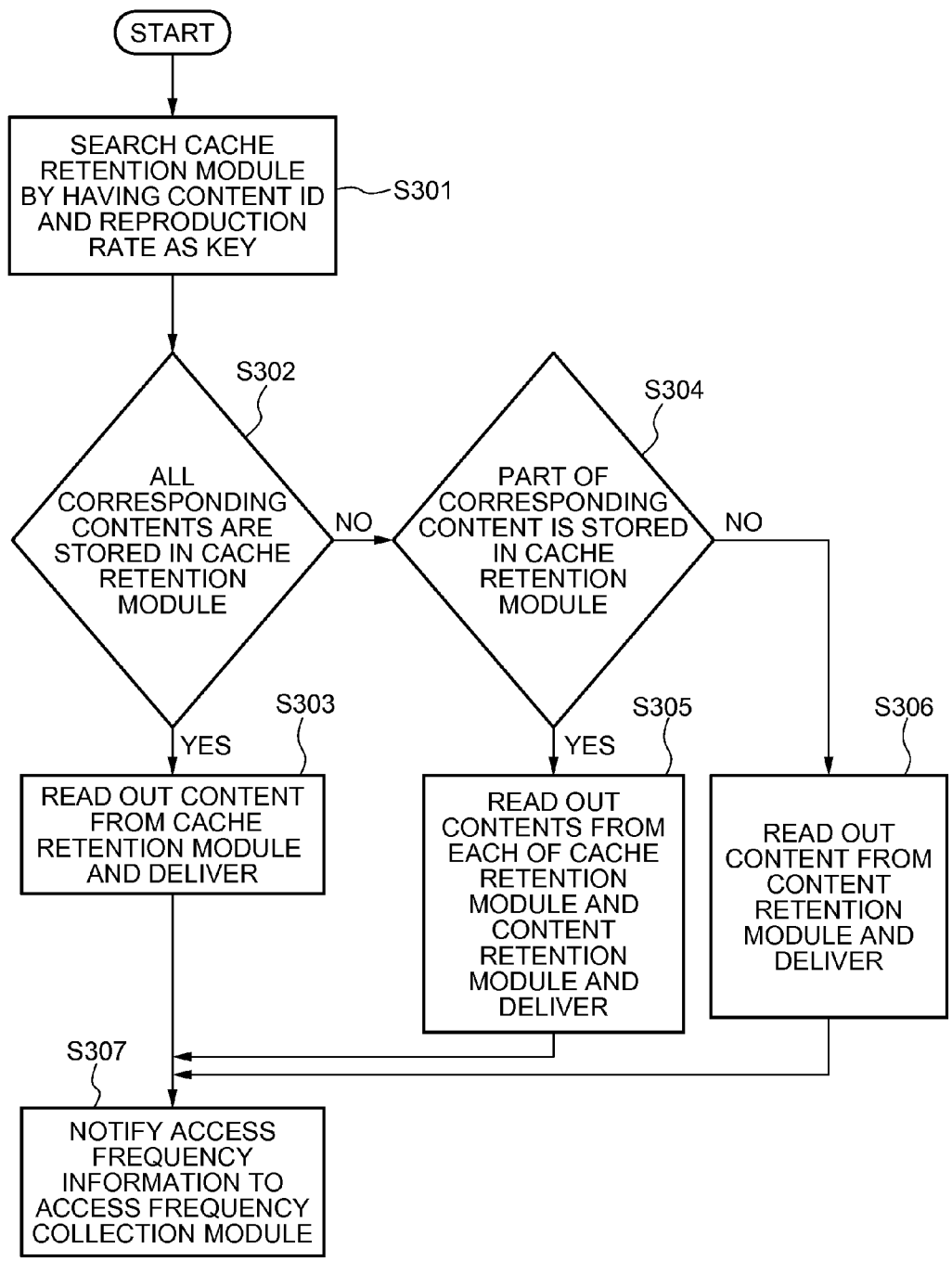
FIG. 8 is a flowchart showing entire operation steps of the content delivery system disclosed in FIG. 1.

Next, operations of the entire content delivery system 100 and the content arrangement determination module 20 will be described by referring to a flowchart of FIG. 8.

First, the cache control module 301 receives a reproduction request (a content delivery request) from the client device

401a, and searches the cache retention module 302 by using a content ID and the reproduction rate contained in the reproduction rate as the key (step S301).

When all the data of the search target content are stored in the cache retention module 302 (YES: step S302), the cache delivery module 303 reads out the target content from the cache retention module 302 and delivers it (step S303).

Then, the cache control module 301 notifies the access frequency degree information (access frequency degree) showing the access frequency degree of each hierarchical data contained in each content in the cache retention module 302 and the access frequency degree of each hierarchical data of the content stored in the content retention module 101 to the access frequency degree collection module 201 (step S307).

It is also possible to set the access frequency degree collection module 201 to calculate the access frequency degree information of each hierarchical data in the cache retention module 302 and the content retention module 101 regularly.

In the meantime, when all the search target content data are not stored in the cache retention module 302 (NO: step S302), the cache control module 301 checks whether or not a part of the data of the target content is stored in the content retention module 302 (step S304).

When a part of the search target content is stored (cached) in the cache retention module 302 and a part of the remainder is stored in the content retention module 101 (YES: step S304: YES), the content delivery device 303 delivers a part of the content data stored in the cache retention module 302 to the client device, and the content delivery module 102 delivers a part of the remaining content data stored in the content retention module 101 to the client device (step S305).

Then, the ache control module 301 notifies the access frequency degree information showing the access frequency degree of each hierarchical data contained in each content in the cache retention module 301 and the access frequency degree of each hierarchical data contained in each content in the content retention module 101 to the access frequency degree collection module 201 (step S307).

In the meantime, when all the search target content data are not stored (cached) in the cache retention module 302 but stored in the content retention module 101 (NO: step S304), the cache control module 301 transmits a content delivery request to the content delivery device 10, and the content delivery module 102 delivers the search target content data stored in the content retention module 101 to the client device (e.g., 401a) in response to the content delivery request (step S306).

Arrangement of the content for the cache retention module 302 of the cache delivery device 30 and replacement/update (replacement) of the content data cached to the cache retention module 302 done by the content arrangement determination module 20 are executed by having a content viewing request from the client device group 40 as a trigger.

Further, the content arrangement determination module 20 may be set to execute the arrangement of the content for the cache retention module 302 of the cache delivery device 30 and replacement/update (replacement) of the content data cached in the cache retention module 302 regularly.

Now, the operation of the content arrangement determination module 20 for determining the content data arranged in the cache delivery device 30 will be described.

It is so defined that the cache capacity set in advance to the cache delivery device 30 is x, the access frequency degree for each viewing bit rate using the layers up to the layer l of the content k t is p(k, l), and the reproduction rate of the encoded layer l of the content k is r(k, l). Further, it is also defined that the length (reproduction time) of the content k is t(k).

Under this, the content arrangement determination module 20 determines the content data to be arranged in the cache delivery device 30 with a condition of $x \leq \Sigma r(k, l) \times t(k)$.

This will be described in details hereinafter.

When there is a reproduction request (a content delivery request, an access request) for the cache delivery device 30 or the content delivery device 10 from the client device group 40, the access frequency degree collection module 201 of the content arrangement determination module 20 calculates the access frequency degree p(k, l) for each viewing bit rate by using the layers up to the encoded layer l of the content k based on the access frequency degree information notified from the cache delivery device 30 and the content delivery device 10.

Further, the hierarchical score determination module 202 calculates v(k, l) as the score value of the encoded layer l of the content k and, for example, based on a following Expression 1.

$$v(k, l) = \sum_{i=l}^{L} \frac{p(k, l)}{r(k, l)t(k)} \quad \text{[Expression 1]}$$

The hierarchical arrangement determination module 203 compares the score values of the encoded layers within the content retention module 101 and the encoded layers within the cache retention module 302 calculated by the hierarchical score determination module 202, and determines the contents arranged (cached) in the cache delivery device 30 by a unit of encoded layer in order from the larger score value to the lower score value (i.e., by giving a priority to the encoded layer of a higher score).

The hierarchical arrangement determination module 203 arranges the encoded layers (hierarchical data) determined based on the score values to the cache retention module 302.

The hierarchical arrangement determination module 203 does not perform arrangement by jumping a lower-order encoded layer, i.e., does not arrange a higher-order encoded layer of a same content to the cache retention module 302 under a state where a lower-order encoded layer contained in a given content is not arranged in the cache retention module 302.

Further, the hierarchical arrangement determination module 203 performs a control so that encoded layers of a same content are not arranged in the cache retention module 302 in a duplicated manner.

Further, regarding the score value (v(k, l)), it is assumed that a state where the score value of the lower-order encoded layer of a same content is higher than the score value of the higher-order encoded layer (lower-order encoded layer score value>higher-order encoded layer score value) is maintained in this exemplary embodiment.

Thereby, when the base layer (the lower-order encoded layer) is not arranged inside the cache retention module 302, the extension layer of a higher order than the base layer is not arranged in the cache retention module 302.

Now, there is considered a case where only the higher-order encoded layer is cached under a state where the lower-order encoded layer of the same content is not cached, for example.

In this case, it is possible that the viewing quality of the content becomes deteriorated when only the higher-order encoded layer is provided to the client device from the cache delivery device 30 and reproduced.

Therefore, when only the higher-order encoded layer is cached, the higher-order encoded layer is not provided to the client device. As a result, the cache hit rate becomes decreased.

Further, there is considered a case where encoding is done with three-layer hierarchy (layers 1, 2, 3: the layer 1 is the lowest-order hierarchy), and the content delivery device 10 and the cache delivery device 30 cannot be used because there is congestion generated between the content delivery device 10 and the cache delivery device 30 (referred to as "source-to-cache" hereinafter).

In such condition, when the layers 1 and 3 are cached (arrangement by jumping the layer 2), the bodily sensed quality experienced on the client device side by the content reproduction corresponds to the layer 1 and the cache hit rate in the cache delivery device 30 becomes 33%.

In the meantime, when the layers 1 and 2 are cached, the bodily sensed quality experienced on the client device side by the content reproduction corresponds to the layers 1, 2. Further, the cache hit rate in the cache delivery device 30 becomes 66%. This makes it possible to suppress deterioration of the cache hit rate.

As described above, in this exemplary embodiment, each content is fractionated by each encoded layer, the score value (v(k, l)) is acquired based on the access frequency degree for each encoded layer of each content, and the encoded layers are arranged in the cache delivery device 30 in order from the higher score to the lower score.

This makes it possible to increase the access frequency degree per capacity of the cached content, so that the cache hit rate can be improved.

Further, with the exemplary embodiment, it is possible to improve the use efficiency of the cache region (cache retention module). At the same time, it is possible to lighten the network load and to perform content delivery by adapting to the environments given to each client device such as network load, processing ability of the client device, congestion level of the delivery server, or the like on a real-time basis.

The reason is because not only the encoding rate of the content to be stored to the delivery server is changed depending on the content access frequency degree but also the cache arrangement can be determined by considering the reproduction rate and the size which are different for each of the contents, when the storage capacity of each delivery device is limited.

Second Exemplary Embodiment

Next, a content delivery system 100 of a second exemplary embodiment according to the invention will be described. Note here that same reference numerals are applied to the same components as those of the first exemplary embodiment described above.

In the second exemplary embodiment, the structural components of the apparatuses of the system are the same as those of the first exemplary embodiment, but the method for calculating v(k, l) that is the score value of the content k and the encoded layer l by the hierarchical score determination module 202 is different from that of the first exemplary embodiment.

This different aspect will be described hereinafter.

In the second exemplary embodiment, the hierarchical score determination module 202 (reproduction cache data determination function) calculates v(k, l) that is the score value of the content k and the encoded layer l based on a user satisfaction function u(k, l) that shows the bodily sensed quality of the client for the content viewing video (content reproduction video) on the client terminal side.

The hierarchical score determination module 202 may be set to acquire an index value showing the content reproduction bodily sensed quality from each client device (a content reproduction information acquiring function), and to calculate the user satisfaction function u(k, l) based on this index value.

Further, the user satisfaction function u(k, l) showing the client bodily sensed quality may be contained in the content delivery request that is transmitted from the client terminal.

Note that is assumed u(k, l) described above is acquired by a subjective evaluation method, for example. The subjective evaluation method is defined as a recommendation 500 (BT. 500) by International Telecommunication Union Radiocommunications Sector (ITU-R), for example. Further, it is also possible to calculate the user satisfaction function u(k, l) showing the bodily sensed quality of the client in advance by a preliminary study and have it registered to the hierarchical score determination module 202.

Note here that the hierarchical score determination module 202 calculates v(k, l) that is the score value of the content k and the encoded layer l, for example, by Expression 2 shown below.

$$v(k, l) = \sum_{i=l}^{L} \frac{p(k, l)u(k, l)}{r(k, l)t(k)} \quad \text{[Expression 2]}$$

It is assumed here that the user satisfaction u(k, l) of the encoded layer l of the content k is given for each viewing bit rate (the number of encoded layers).

Figure 11:
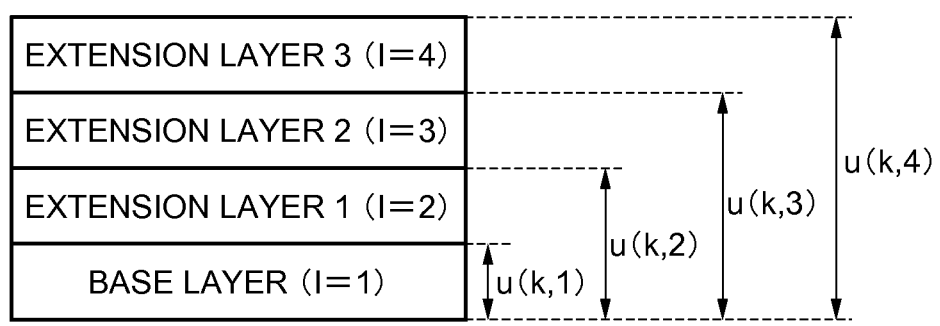
FIG. 11 is an explanatory chart showing an example of a data structure of values of satisfaction degrees of viewer clients of the content delivery system disclosed in FIG. 1.

Specifically, as shown in FIG. 11, for example, it is so defined that u(k, 1) is a value that shows the bodily sensed quality of the client when receiving and viewing only the base layer (l=1) of the content k.

Further, u(k, 2) is a value that shows the bodily sensed quality of the client when receiving and viewing the base layer (l=1) and the extension layer 1 (l=2) of the content k, u(k, 3) is a value that shows the bodily sensed quality of the client when receiving and viewing the base layer (l=1), the extension layer 1 (l=2), and the extension layer 2 (l=3) of the content k, and u(k, 4) is a value that shows the bodily sensed quality of the client when receiving and viewing the base layer (l=1), the extension layer 1 (l=2), the extension layer 2 (l=3), and the extension layer 3 (l=4) of the content k.

Thereby, the hierarchical arrangement determination module 203 can arrange the encoded layers based on the score values (v(k, l)) which are determined depending on the reproduction ability (reproduction environment) of each client terminal and the content reproduction state as well as the reproduction quality of the client side that may vary due to the congestion state of the network on which the content is delivered.

Further, the content delivery module 303 may be set to adjust the content delivery rate (delivery pace) based on the score value (v(k, l)) that is set in the manner described above.

As described above, as in the case of the first exemplary embodiment, it is also possible with the second exemplary embodiment to improve the use efficiency of the cache region, to lighten the network load, and to perform content delivery by adapting to environments given to each client device such as processing ability of the client device, congestion level of the delivery server, or the like on a real-time basis. Therefore, the satisfaction degree of the client regarding the content reproduction can be improved.

Third Exemplary Embodiment

Next, a content delivery system 100 of a third exemplary embodiment according to the invention will be described. Note here that same reference numerals are applied to the same components as those of the first and second exemplary embodiments described above.

In the third exemplary embodiment, the structural components of the apparatuses of the system are the same as those of the first exemplary embodiment, but the method for calculating v(k, l) that is the score value of the content k and the encoded layer l by the hierarchical score determination module 202 is different from those of the first and second exemplary embodiments.

This different aspect will be described hereinafter.

In the third exemplary embodiment, the hierarchical score determination module 202 (reproduction cache data determination function) calculates v(k, l) that is the score value of the content k and the encoded layer l based on a user satisfaction function u(d, k, l) that shows the client satisfaction degree for the content viewing video different for each of the client terminals. Note that d is an ID that shows the type of the client terminal.

The hierarchical score determination module 202 may be set to acquire an index value showing the content reproduction bodily sensed quality from each client device, and to calculate the user satisfaction function u(d, k, l) based on this index value.

Further, the user satisfaction function u(d, k, l) showing the client bodily sensed quality may be contained in the content delivery request that is transmitted from the client terminal.

Furthermore, it is also possible to calculate the user satisfaction function u(d, k, l) showing the bodily sensed quality of the client in advance by a preliminary study and have it registered to the hierarchical score determination module 202.

Note here that u(d, k, l) can be acquired by employing a subjective evaluation method for each type of the client terminals classified based on a screen size or the like, for example.

As described above, the subjective evaluation method is defined as a recommendation 500 (BT. 500) by International Telecommunication Union Radiocommunications Sector (ITU-R), for example.

Note here that the hierarchical score determination module 202 calculates v(k, l) that is the score value of the content k and the encoded layer l, for example, based on Expression 3 shown below.

$$v(k, l) = \sum_{i=l}^{L} \frac{p(k, l)u(d, k, l)}{r(k, l)t(k)} \quad \text{[Expression 3]}$$

It is assumed here that the user satisfaction u(d, k, l) of the encoded layer l of the content k is given for each viewing bit rate (the number of encoded layers).

Figure 12:
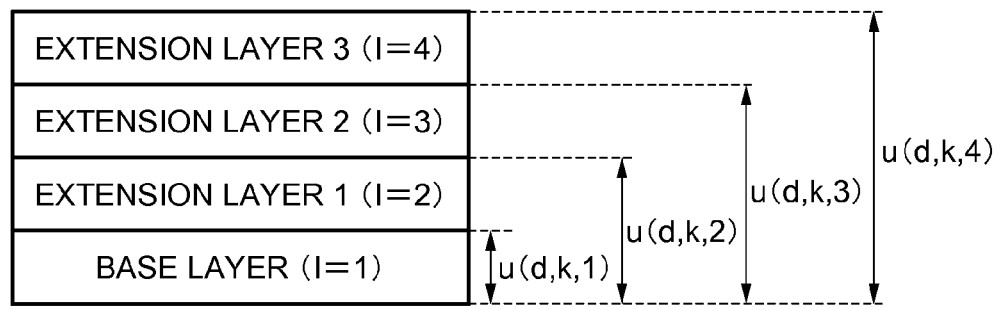
FIG. 12 is an explanatory chart showing an example of a data structure of values of satisfaction degrees of viewer clients of the content delivery system disclosed in FIG. 1.

Specifically, as shown in FIG. 12, for example, it is so defined that u(d, k, 1) is a value that shows the bodily sensed quality of the client when viewing only the base layer (l=1) of the content k.

Further, u(d, k, 2) is a value that shows the bodily sensed quality of the client when receiving and viewing the base layer (l=1) and the extension layer 1 (l=2) of the content k, u(d, k, 3) is a value that shows the bodily sensed quality of the client when receiving and viewing the base layer (l=1), the extension layer 1 (l=2), and the extension layer 2 (l=3) of the content k, and u(d, k, 4) is a value that shows the bodily sensed quality of the client when receiving and viewing the base layer (l=1), the extension layer 1 (l=2), the extension layer 2 (l=3), and the extension layer 3 (l=4) of the content k.

Thereby, the hierarchical arrangement determination module 203 can arrange the encoded layers based on the score values (v(k, l)) which are determined by reflecting the reproduction ability (reproduction environment) of each client terminal, the content reproduction state of the client side that may vary due to the congestion state of the network on which the content is delivered, and the content reproduction quality that varies depending on the respective type of each of the client terminals.

Further, the content delivery module 303 may be set to adjust the content delivery rate (delivery pace) based on the score value (v(k, l)) that is set in the manner described above.

As described above, as in the case of the first and second exemplary embodiments, it is also possible with the third exemplary embodiment to improve the use efficiency of the cache region, to lighten the network load, and to perform content delivery by adapting to the content reproduction environments and resources of each of the client devices such as processing ability of the client device, congestion level of the delivery server, or the like on a real-time basis. Therefore, the satisfaction degrees regarding reproduction of the content different for each of the client devices can be improved, respectively.

While the present invention has been described heretofore by referring to the embodiments (and EXAMPLES), the present invention is not limited only to the embodiments (and EXAMPLES). Various changes and modifications occurred to those skilled in the art can be applied to the structures and details of the present invention without departing from the scope of the present invention.

This Application claims the Priority right based on Japanese Patent Application No. 2009-171362 filed on Jul. 22, 2009 and the disclosure thereof is hereby incorporated by reference in its entirety.

INDUSTRIAL APPLICABILITY

The present invention can be applied to a network delivery system which delivers video contents such as broadcast programs and movies via a network. In particular, the present invention can be applied to a network delivery system for delivering content data, which carries a large number of subscribers and is required to have a high delivery performance. Further, the present invention can be applied to a delivery service not only for video data as the contents but also for various kinds of content data such as music and games.

REFERENCE NUMERALS

10 Content delivery device
20 Content arrangement determination module
30 Cache delivery device
40 Client device group
50 Network
101 Content retention module
102 Content delivery module
201 Access frequency degree collection module
202 Hierarchical score determination module
203 Hierarchical arrangement determination module 301 Cache control module
302 Cache retention module
303 Content delivery module
401a, 402b, 403c Client device

The invention claimed is:

1. A content delivery system, comprising:
a first hardware processor configured to store content data to be delivered by sectioning the data into a plurality of pieces of hierarchical data of different encoding rates;
a cache delivery device configured to load the content data from the first hardware processor and temporarily cache the loaded content data;
a content delivery device configured to deliver the content data in response to an access request from an external terminal; and
a cache content replacement controller, implemented by a second hardware processor, configured to replace the content data cached in advance with hierarchical data read out by the first hardware processor, wherein
the cache content replacement controller is further configured to:
calculate access request frequency degrees from the external terminal for each of the content data and each hierarchical data of the content data;
calculate a proportion of a product of the access frequency degree and a user satisfaction function showing a bodily sensed quality of a client for a size of the content data as the score when calculating scores showing priority degrees to be stored for each of the hierarchical data of the content data based on the calculated access request frequency degrees; and
judge whether or not to cache the data for each of the hierarchical data based on the scores.

2. The content delivery system as claimed in claim 1, wherein the
cache content replacement controller is further configured to calculate a proportion of a product of the access frequency degree and a user satisfaction function showing a bodily sensed quality of a client different for each client device for the size of the content data as the score.

3. The content delivery system as claimed in claim 1, wherein the cache content replacement controller is further configured include a jumping cache prevention function which prevents hierarchical data of a higher hierarchical order from being cached in a case where hierarchical data of a lower hierarchical order is not cached in advance based on hierarchical orders set in advance to each hierarchical data contained in a same content data, when caching the hierarchical data.

4. The content delivery system as claimed in claim 1, wherein the cache content replacement controller is further configured to calculate
the access frequency degree regularly or when there is an access request from the external terminal for the first hardware processor.

5. A content delivery method which temporarily caches content data stored in a content retention unit by sectioning the data into a plurality of pieces of hierarchical data of different encoding rates to a cache retention unit and delivers the content data in response to an access request from an external terminal, the method comprising:
calculating access request frequency degrees from the external terminal for each of the content data and each hierarchical data of the content data;
calculating a proportion of a product of the access frequency degree and a user satisfaction function showing a bodily sensed quality of a client for a size of the content data as the score when calculating scores showing priority degrees to be stored in the cache retention unit for each of the hierarchical data of the content data based on the calculated access request frequency degrees; and
judging whether or not to cache the data for each of the hierarchical data based on the scores.

6. A non-transitory computer readable recording medium storing a content delivery program for delivering content data in response to an access request made from an external terminal, comprising: a content retention unit which stores content data to be delivered by sectioning the data into a plurality of pieces of hierarchical data of different encoding rates; a cache retention unit which loads the content data and temporarily caches the loaded content data; and a cache content replacement control unit which replaces the content cached in advance to the cache retention unit with hierarchical data read out from the content retention unit, the program causing a computer to execute:
an access frequency degree calculation function which calculates access request frequency degrees from the external terminal for each of the content data and each hierarchical data of the content data;
a score determination function which calculates a proportion of a product of the access frequency degree and a user satisfaction function showing a bodily sensed quality of a client for a size of the content data as the score when calculating scores showing priority degrees to be stored in the cache retention unit for each of the hierarchical data of the content data based on the calculated access request frequency degrees; and
a cache content replacement/update function which judges whether or not to cache the data for each hierarchical data based on the scores.

7. A content delivery system, comprising:
content retention means for storing content data to be delivered by sectioning the data into a plurality of pieces of hierarchical data of different encoding rates;
cache retention means for loading the content data and temporarily caching the loaded content data; and
data delivery means for delivering the content data in response to an access request from an external terminal, the system comprising:
cache content replacement control means for replacing the content data cached in advance to the cache retention means with hierarchical data read out from the content retention means, wherein
the cache content replacement control means includes:
access frequency degree calculation means for calculating access request frequency degrees from the external terminal for each of the content data and each hierarchical data of the content data;
score determination means for calculating a proportion of a product of the access frequency degree and a user satisfaction function showing a bodily sensed quality of a client for a size of the content data as the score when calculating scores showing priority degrees to be stored in the cache retention means for each of the hierarchical data of the content data based on the calculated access request frequency degrees; and
cache content replacement/update means for judging whether or not to cache the data for each of the hierarchical data to the cache retention means based on the scores.

* * * * *